April 16, 1940.  H. L. WELKER ET AL  2,197,087
CONTINUOUS PROCESS FOR MANUFACTURING RUBBER THREADS,
STRIPS, AND THE LIKE, FROM LATEX
Filed Nov. 13, 1935
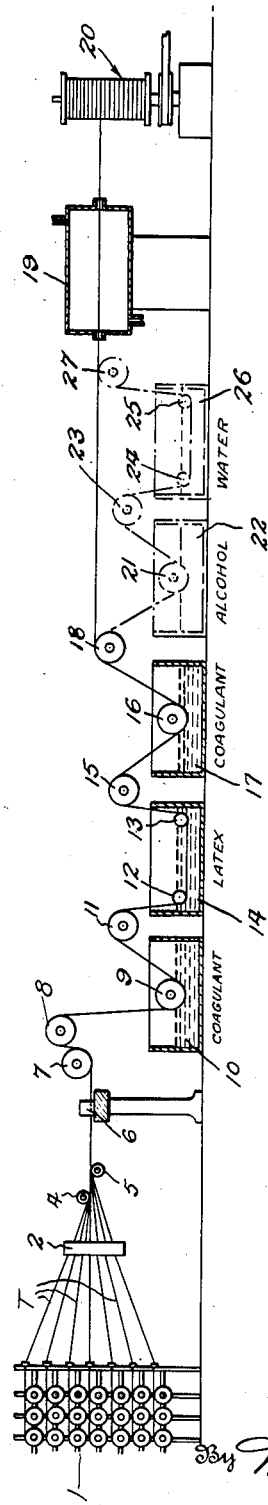
Inventors
Harry L. Welker
Frits Cremer
By Mason Fenwick + Lawrence
Attorneys Patented Apr. 16, 1940

2,197,087

UNITED STATES PATENT OFFICE 2,197,087

CONTINUOUS PROCESS FOR MANUFACTURING RUBBER THREADS, STRIPS, AND THE LIKE FROM LATEX

Harry Logue Welker and Frits Cremer, Williamsport, Pa., assignors to Harry Logue Welker, Williamsport, Pa.

Application November 13, 1935, Serial No. 49,590

5 Claims. (Cl. 18—54)

The invention forming the subject matter of this application is a continuous process for manufacturing rubber threads, strips and the like from rubber latex.

The object of the invention is to provide a process by which rubber threads and strips may be manufactured rapidly and at very low cost.

Other objects of the invention will become apparent as a detailed description thereof proceeds.

The drawing is a diagram illustrating the various steps employed in the carrying out of this process.

In the following description, the process of manufacturing rubber threads will be described in detail. It is to be understood, however, that the process is not limited to the manufacture of threads but is intended to cover the manufacture of rubber strips of all widths.

As shown in the drawing, a plurality of threads T are drawn from a creel 1 through a thread board 2, and between guide rods 4 and 5. From the guide rods the threads are drawn through a comb 6, by means of which the threads are kept separated from and substantially parallel to each other. The parallel threads are then drawn through idler rolls 7 and 8. From the idler roll 8 the threads are drawn under a roller 9, immersed in a bath of coagulant 10. From the roller 9 the threads are drawn over an idler roll 11 and thence are passed under guide rods 12 and 13 fixed below the level of a bath of rubber latex 14. From the rod 13 the threads are drawn over an idler 15 and thence are drawn under a roller 16 which is immersed in a bath of coagulant 17. From the bath of coagulant 17 the threads are drawn over an idler 18. From the idler 18 the threads may be drawn directly through a curing or vulcanizing chamber 19 to a spooling device which is designated generally by the reference numeral 20.

As so far described, the process is complete, and would be sufficient for the manufacture of rubber threads for certain purposes. However, it is preferred to pass the threads through two other intermediate steps which, while not necessary to the actual production of rubber threads, serve to improve the product.

In the preferred process, the threads after being drawn over the idler 18 are passed under a roller 21 immersed in a bath of alcohol 22. From the alcohol bath 22, the threads are drawn over an idler 23, and thence under rods 24 and 25 in a water bath 26 to and over an idler 27. From the idler 27, the threads are drawn through the curing chamber 19 to the spooling device as previously described.

In the carrying out of this process, it is intended that the threads T shall be destroyed as soon as they have performed their function of serving as a base for the formation of the rubber threads. Accordingly, the coagulant in the bath 10 is made of such material as will destroy the threads within a predetermined time. For example, the coagulant in the bath 10 may comprise about seven parts of sulphuric acid to one part of alcohol. The sulphuric acid would not destroy the thread instantly, but would require some time to effect this destruction. Therefore, as the coagulant impregnated threads are passed over the roller 11 and through the latex bath 14, the threads have sufficient body to support the coating of latex formed thereon. The thickness of the latex coating will depend, of course, upon the time of immersion in the latex bath, and this time can be regulated by varying the distances between the rods 12 and 13, which are preferably non-rotatably mounted.

The coagulant in the bath 17 should be considerably weaker in its sulphuric acid ingredients than that of the coagulant bath 10. Preferably, the proportion of ingredients are about reversed; that is, the coagulant in bath 10 would comprise about one part of sulphuric acid to seven parts of alcohol. This second bath of coagulant hardens the outer surface of the rubber coating on the threads.

After removal from the coagulant bath 17, it is preferable to move the rubber coated threads through the alcohol bath to harden the same, and give them a better set. The washing of the threads in the water bath removes the lipin and poisonous matter from the latex. The final curing is effected by passing the rubber coated threads through the curing chamber to the spooling mechanism.

It has been found in actual use that with the particular coagulant employed, a cotton thread employed as a foundation for the rubber coating has become disintegrated or burned out by the sulphuric acid during their progress through the various baths. At the start of the process, the threads are, of course, inelastic, but the final product, being pure rubber mixed with the ash of the thread, is highly elastic, the material of the thread being apparently absorbed in the rubber. In any case, it has been found that the finished rubber thread possessed none of the characteristics of the cotton thread which formed the foundation therefor during the carrying out of the various steps of the process, and the resultant product has all the characteristics of a pure rubber thread.

It is obvious that the textile thread or textile support employed in the carrying out of the processes described herein must be of such character that it will be destroyed by the coagulant employed. It will be evident that the tension on the rubber threads during and after the reduction of the textile thread or cord to ash causes a collapse of the latex coating on the ash core so that the resultant thread is substantially solid rubber.

What we claim is:

1. A substantially solid rubber thread collapsed and vulcanized about a residual core of charred textile fibre.

2. A process of manufacturing rubber thread which comprises: saturating a textile thread with a coagulant consisting of about seven parts sulphuric acid and one part alcohol and adapted to reduce the thread to ash, coating the coagulant saturated thread with rubber latex during the reduction of the textile thread to ash, and vulcanizing the resultant substantially solid rubber thread after such reduction.

3. The process of manufacturing a substantially solid elastic thread which comprises: saturating a textile thread with a coagulant including sulphuric acid as an ingredient and adapted to reduce the thread to ash, coating the coagulant saturated thread with rubber latex during the reduction of the textile thread to ash, and curing the resultant substantially solid rubber thread after such reduction.

4. The process of manufacturing a substantially solid elastic thread which comprises saturating a textile thread with a coagulant comprising sulphuric acid adapted to reduce the thread to ash, coating the coagulant saturated thread with rubber latex during the reduction of the textile thread to ash, drawing the latex coated thread under tension through a coagulant during the reduction of the thread to ash and vulcanizing the resultant substantially solid rubber thread after such reduction.

5. A process of manufacturing an elastic thread comprising absorbing in a cellulosic textile fibre a solution of sulphuric acid adapted to char the thread to ash, coating the thread with rubber latex and while the textile fibre is charring subjecting the rubber thread to a second solution adapted to coagulate the latex, and then vulcanizing the rubber thread.

HARRY LOGUE WELKER.
FRITS CREMER.